(12) United States Patent
Chumbley et al.

(10) Patent No.: US 9,503,541 B2
(45) Date of Patent: Nov. 22, 2016

(54) FAST MOBILE WEB APPLICATIONS USING CLOUD CACHING

(71) Applicant: International Business Machines Corporation, Armonk, NY (US)

(72) Inventors: Robert B. Chumbley, Round Rock, TX (US); Jacob D. Eisinger, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 528 days.

(21) Appl. No.: 13/971,927

(22) Filed: Aug. 21, 2013

(65) Prior Publication Data

US 2015/0058435 A1 Feb. 26, 2015

(51) Int. Cl.
*H04L 29/08* (2006.01)
*G06F 17/30* (2006.01)
*G06F 12/00* (2006.01)

(52) U.S. Cl.
CPC ........... *H04L 67/2842* (2013.01); *G06F 12/00* (2013.01); *G06F 17/30902* (2013.01)

(58) Field of Classification Search
CPC .................... H04L 67/2842; H04L 29/08801; G06F 17/30132; G06F 15/16
USPC ........................................................ 709/213
See application file for complete search history.

(56) References Cited

U.S. PATENT DOCUMENTS

| | | | |
|---|---|---|---|
| 7,594,003 B2 | 9/2009 | Davidson et al. | |
| 8,234,348 B1 * | 7/2012 | Tulchinsky | H04L 67/34 709/214 |
| 8,407,768 B1 * | 3/2013 | Hayter | H04L 63/0853 726/5 |
| 8,745,245 B1 * | 6/2014 | Bullock | H04L 12/2647 709/227 |
| 2007/0156966 A1 * | 7/2007 | Sundarrajan | G06F 12/0808 711/133 |
| 2007/0226320 A1 * | 9/2007 | Hager | G06F 17/30194 709/219 |
| 2008/0072069 A1 * | 3/2008 | Heithcock | G06F 21/128 713/192 |
| 2008/0249782 A1 * | 10/2008 | Ativanichayaphong | H04L 29/08072 704/275 |
| 2009/0112938 A1 * | 4/2009 | Petri | G06F 17/30289 |
| 2009/0228779 A1 | 9/2009 | Williamson et al. | |
| 2009/0241104 A1 * | 9/2009 | Amiga | G06F 8/65 717/174 |
| 2009/0249321 A1 * | 10/2009 | Mandyam | G06F 8/65 717/171 |

(Continued)

OTHER PUBLICATIONS

Needleman, Rafe, "There's an app for that . . . but why?", CNET News, 4 pages, Dec. 14, 2011, < http://news.cnet.com/8301-19882_3-57342514-250/theres-an-app-for-that..-but-why/?tag=txt;title>.

(Continued)

*Primary Examiner* — Kevin Bates
*Assistant Examiner* — Mark A Scott
(74) *Attorney, Agent, or Firm* — Jordan IP Law, LLC

(57) ABSTRACT

Methods and systems may provide for identifying a web application having a primary resource that references a secondary resource, wherein the primary resource contains a version identifier of the primary resource and a version identifier of the secondary resource. Additionally, a cached version of the primary resource and a cached version of the secondary resource may be created on a mobile device, and the version identifier of the primary resource may be used to determine whether the secondary resource is stale. In one example, it may be determined that staleness checking has been disabled in the secondary resource. Moreover, if the primary resource does not contain the version identifiers, cloud caching may be used.

17 Claims, 5 Drawing Sheets

(56) References Cited

U.S. PATENT DOCUMENTS

| | | | |
|---|---|---|---|
| 2009/0327421 A1* | 12/2009 | Fu | G06F 17/3089 709/204 |
| 2010/0037206 A1* | 2/2010 | Larimore | |
| 2010/0235321 A1* | 9/2010 | Shukla | G06F 17/30902 707/610 |
| 2010/0235829 A1* | 9/2010 | Shukla | H04L 67/34 717/177 |
| 2010/0235830 A1* | 9/2010 | Shukla | G06F 9/44526 718/1 |
| 2010/0262717 A1* | 10/2010 | Critchley | H04L 12/42 709/251 |
| 2010/0274910 A1* | 10/2010 | Ghanaie-Sichanie | H04L 9/3234 709/229 |
| 2011/0082984 A1* | 4/2011 | Yuan | G06F 17/30902 711/147 |
| 2011/0138295 A1* | 6/2011 | Momchilov | G06F 9/4445 715/740 |
| 2011/0145786 A1* | 6/2011 | Fayed | G06F 9/45512 717/115 |
| 2011/0161297 A1* | 6/2011 | Parab | G06F 11/1453 707/646 |
| 2011/0197032 A1* | 8/2011 | Patey | G06F 17/3048 711/133 |
| 2011/0208958 A1* | 8/2011 | Stuedi | G06F 17/30017 713/150 |
| 2011/0282997 A1* | 11/2011 | Prince | H04L 67/146 709/226 |
| 2011/0289513 A1* | 11/2011 | Degirmenci | G06F 9/542 719/313 |
| 2012/0023190 A1* | 1/2012 | Backholm | H04W 4/18 709/217 |
| 2012/0030313 A1* | 2/2012 | McGowan | H04L 67/10 709/219 |
| 2012/0254292 A1* | 10/2012 | Newton | H04L 67/36 709/203 |
| 2012/0272178 A1* | 10/2012 | Oygard | G06F 17/30884 715/781 |
| 2012/0296959 A1* | 11/2012 | Momchilov | G06F 9/54 709/203 |
| 2012/0317276 A1* | 12/2012 | Muniraju | H04L 41/14 709/224 |
| 2012/0320916 A1* | 12/2012 | Sebastian | H04N 21/2402 370/390 |
| 2012/0331376 A1* | 12/2012 | Gorokhovsky | G06F 17/30899 715/234 |
| 2013/0024759 A1* | 1/2013 | Yuan | G06F 17/30902 715/205 |
| 2013/0054514 A1* | 2/2013 | Barrett-Kahn | G06F 17/30902 707/608 |
| 2013/0074158 A1* | 3/2013 | Koskimies | H04L 63/0428 726/4 |
| 2013/0086114 A1* | 4/2013 | Wilson | G06F 17/30575 707/783 |
| 2013/0110961 A1* | 5/2013 | Jadhav | G06F 15/167 709/213 |
| 2013/0124807 A1* | 5/2013 | Nielsen | G06F 11/1438 711/162 |
| 2013/0246944 A1* | 9/2013 | Pandiyan | G06F 9/54 715/760 |
| 2013/0297802 A1* | 11/2013 | Laribi | H04L 47/80 709/226 |
| 2013/0325899 A1* | 12/2013 | Mohaban | G06Q 10/10 707/791 |
| 2013/0326333 A1* | 12/2013 | Hashmi | G06F 17/2247 715/234 |
| 2014/0005809 A1* | 1/2014 | Frei | H04L 29/1249 700/90 |
| 2014/0006924 A1* | 1/2014 | Tsolis | G06F 17/30893 715/234 |
| 2014/0067990 A1* | 3/2014 | Abdelhameed | G06F 17/30902 709/213 |
| 2014/0068595 A1* | 3/2014 | Belinsky | G06F 8/65 717/173 |
| 2014/0075322 A1* | 3/2014 | Delano | H04L 41/22 715/736 |
| 2014/0115406 A1* | 4/2014 | Agrawal | H04L 67/06 714/47.1 |
| 2014/0280691 A1* | 9/2014 | Buerner | H04L 67/02 709/217 |
| 2014/0282032 A1* | 9/2014 | Brown | G06F 3/0484 715/738 |
| 2015/0019686 A1* | 1/2015 | Backholm | G06F 17/30861 709/217 |
| 2015/0039999 A1* | 2/2015 | Chasman | H04L 67/02 715/234 |
| 2015/0046915 A1* | 2/2015 | Oliver | H04L 67/10 717/170 |
| 2015/0055557 A1* | 2/2015 | Dong | H04W 4/005 370/328 |
| 2015/0199278 A1* | 7/2015 | Fioravanti | G06F 12/0891 711/135 |
| 2015/0222512 A1* | 8/2015 | Kay | G06F 11/30 709/224 |

OTHER PUBLICATIONS

"HTML 5.1 Nightly: A vocabulary and associated APIs for HTML and XHTML," 26 pages, section 5.7, Apr. 15, 2013, <http://www.w3.org/html/wg/drafts/html/master/browsers.html#offline>.

* cited by examiner

FAST MOBILE WEB APPLICATIONS USING CLOUD CACHING

BACKGROUND

Embodiments of the present invention generally relate to the management of web applications. More particularly, embodiments relate to the use of cloud caching and/or simplified client-side staleness checking to manage web applications on mobile devices.

Many web applications that are made available through mobile application stores (e.g., IPHONE application stores, ANDROID application stores, etc.) may contain the same functionality of a web page. Thus, the web application may serve little other purpose than that of a bookmark that links to a set of resources over a network. In such a case, the process of accessing the web application may be relatively slow due to intermittent and/or no Internet access. While more recent technology such as HTML5 (Hypertext Markup Language 5) offline manifest access may address certain concerns regarding the usability of web applications, there remains considerable room for improvement.

BRIEF SUMMARY

Embodiments may include a computer implemented method that involves identifying a web application having a primary resource that references a secondary resource and creating a shell resource that contains a version identifier of the primary resource and a version identifier of the secondary resource. The method may also provide for creating a cached version of the shell resource and a cached version of the secondary resource on a cloud server and creating a manifest for the web application. In addition, one or more of the version identifier of the primary resource and the version identifier of the secondary resource may be used to conduct a staleness check of the web application, wherein one or more of the primary resource and the secondary resource may be updated based on the staleness check.

Embodiments may include a computer program product having a computer readable storage medium and computer usable code stored on the computer readable storage medium. If executed by a processor, the computer usable code may cause a cloud server to identify a web application having a primary resource that references a secondary resource and create a shell resource that contains a version identifier of the primary resource and a version identifier of the secondary resource. The computer usable code may also cause a cloud server to create a cached version of the shell resource and a cached version of the secondary resource on the cloud server and create a cache manifest for the web application. Additionally, the computer usable code may cause a cloud server to use one or more of the version identifier of the primary resource and the version identifier of the secondary resource to conduct a staleness check of the web application and update one or more of the cached version of the shell resource and the cached version of the secondary resource based on the staleness check. In addition, the computer usable code may cause a cloud server to update the cache manifest based on the staleness check.

Embodiments may also include a computer program product having a computer readable storage medium and computer usable code stored on the computer readable storage medium. If executed by a processor, the computer usable code may cause a mobile device to identify a web application having a primary resource that references a secondary resource, wherein the primary resource contains a version identifier of the primary resource and a version identifier of the secondary resource. The computer usable code may also cause a mobile device to create a cached version of the primary resource and a cached version of the secondary resource on the mobile device and use the version identifier of the primary resource to determine whether the secondary resource is stale.

BRIEF DESCRIPTION OF THE SEVERAL VIEWS OF THE DRAWINGS

The various advantages of the embodiments of the present invention will become apparent to one skilled in the art by reading the following specification and appended claims, and by referencing the following drawings, in which:

DETAILED DESCRIPTION

Figure 1:
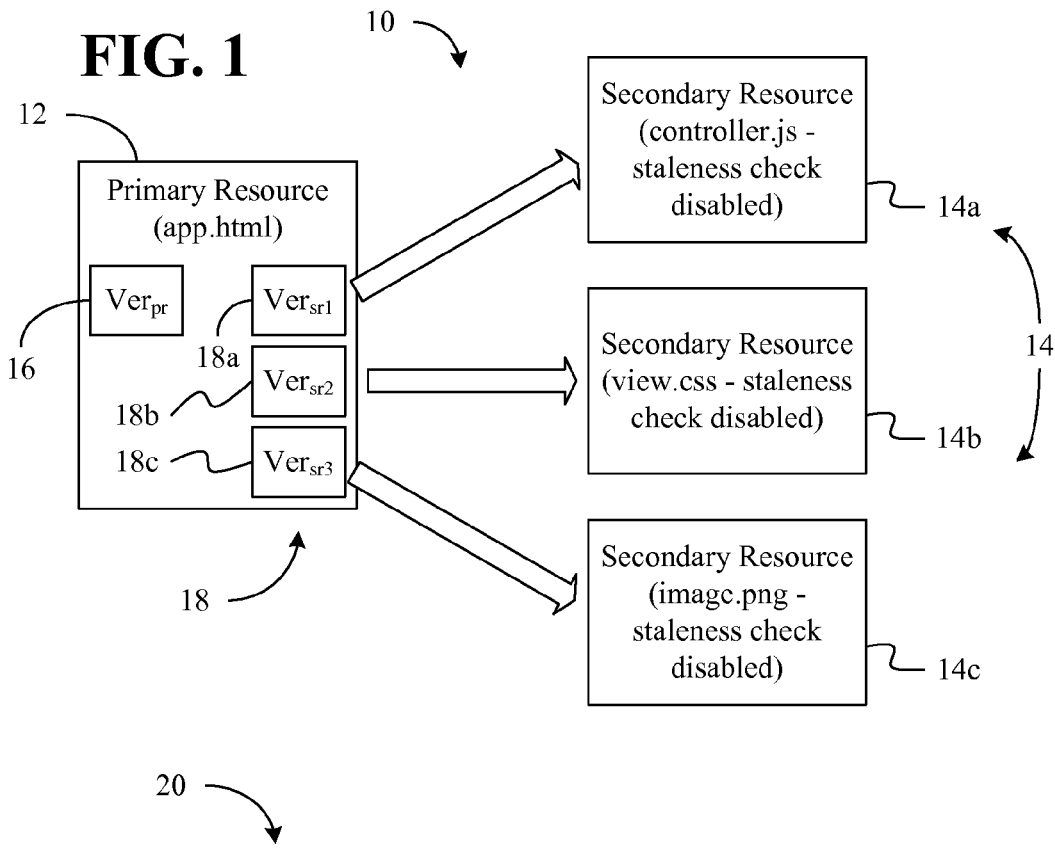
FIG. 1 is a block diagram of an example of a web application according to an embodiment.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Client-Side Staleness Checking

Referring now to FIG. 1, a web application 10 is shown, wherein the web application 10 has a primary (e.g., parent, master) resource 12 that references one or more secondary (e.g., child) resources 14 (14a-14c). The web application 10 may generally provide a wide variety of functions such as, for example, loan calculations, currency conversions, animation, etc., to client devices such as, smart tablets, wireless smart phones and other mobile devices. The primary resource 12 might function as a top level bookmark (e.g., "app.html") that links to a JAVASCRIPT secondary resource 14a (e.g., "controller.js"), a style sheet secondary resource 14b (e.g., "style.css"), an image secondary resource 14c (e.g., "image.png"), and so forth, wherein the secondary resources 14 enable the overall functionality of the web application 10.

In the illustrated example, the primary resource 12 contains a version identifier 16 ("$Ver_{pr}$") of the primary resource 12 and version identifiers 18 (18a-18c) of the secondary resources 14. For example, a first version identifier 18a ("$Ver_{sr1}$") may correspond to the JAVASCRIPT secondary resource 14a, a second version identifier 18b ("$Ver_{sr2}$") may correspond to the style sheet secondary resource 14b, a third version identifier 18c ("$Ver_{sr3}$") may correspond to the image secondary resource 14c, and so forth. The version identifier 16 may generally indicate the current version level of the primary resource 12 and the version identifiers 18 may generally indicate the current version level of the respective secondary resources 14. Table I below shows one of example of such a web application 10 configuration.

TABLE I

| App Version | Version 1 | Version 2 | Version 3 |
|---|---|---|---|
| app.html contents | <!DOCTYPE HTML PUBLIC "-//W3C//DTD HTML 4.01 Transitional//EN"><br><html><br><head><br><title>Version 1</title><br><meta http-equiv="Content-Type" content="text/html; charset=UTF-8"><br><script type="text/javascript" src="controller.js?version=1.1"/> | <!DOCTYPE HTML PUBLIC "-//W3C//DTD HTML 4.01 Transitional//EN"><br><html><br><head><br><title>Version 2</title><br><meta http-equiv="Content-Type" content="text/html; charset=UTF-8"><br><script type="text/javascript" src="controller.js?version=1.1"/> | <!DOCTYPE HTML PUBLIC "-//W3C//DTD HTML 4.01 Transitional//EN"><br><html><br><head><br><title>Version 3</title><br><meta http-equiv="Content-Type" content="text/html; charset=UTF-8"><br><script type="text/javascript" src="controller.js?version=2.0"/> |

TABLE I-continued

| App Version | Version 1 | Version 2 | Version 3 |
|---|---|---|---|
| | <styletype="text/css" src="view.css?version=2.3"/><br></head><br><body><br>  <h1>Version 1</h1><br>    <img alt="Image Resource" src="image.png?version=1.0" /><br></body><br></html> | <styletype="text/css" src="view.css?version=2.3"/><br></head><br><body><br>  <h1>Version 2</h1><br>    <img alt="Image Resource" src="image.png?version=1.1" /><br></body><br></html> | <styletype="text/css" src="view.css?version=3.0"/><br></head><br><body><br>  <h1>Version 3</h1><br>    <img alt="Image Resource" src="image.png?version=1.1" /><br></body><br></html> |
| Secondary resource Version (bolded is updated) | controller.js = 1.1<br>view.css = 2.3<br>image.png = 1.0 | controller.js = 1.1<br>view.css = 2.3<br>image.png = 1.1 | controller.js = 2.0<br>view.css = 3.0<br>image.png = 1.1 |

Thus, if the version identifier 16 of the primary resource 12 is "Version 1" as in the leftmost example of Table I, the first version identifier 18a of the JAVASCRIPT secondary resource 14a would be "controller.js?version=1.1", the second version identifier 18b of the style sheet secondary resource 14b would be "view.css?version=2.3", and the third version identifier 18c of the image secondary resource 14c would be "image.png?version=1.0", in the example shown. Similarly, if the version identifier 16 of the primary resource 12 is "Version 2" as in the middle example of Table I, the first version identifier 18a of the JAVASCRIPT secondary resource 14a would be "controller.js?version=1.1", the second version identifier 18b of the style sheet secondary resource 14b would be "view.css?version=2.3", and the third version identifier 18c of the image secondary resource 14c would be "image.png?version=1.1". Accordingly, if it is determined that the primary resource 12 is at Version 2 but a client device has cached an older version of the image secondary resource 14c (e.g., version 1.0 instead of version 1.1), an update to the cached version of the image secondary resource 14c may be conducted. Similar determinations and updates may be made for the rightmost example of Table I and subsequent versions.

Of particular note is that staleness checking has been disabled in the illustrated secondary resources 14. One approach to disabling staleness checking may be to set a max-age header of each secondary resources 14 to a value that is so high (e.g., five years) that a staleness check will never be triggered by the secondary resources 14 themselves. As will be discussed in greater detail, disabling staleness checking in the secondary resources 14 and incorporating the version identifiers 16, 18 into the primary resource 12 may enable simplified client-side staleness checking, enhanced performance and longer battery life.

Figure 2:
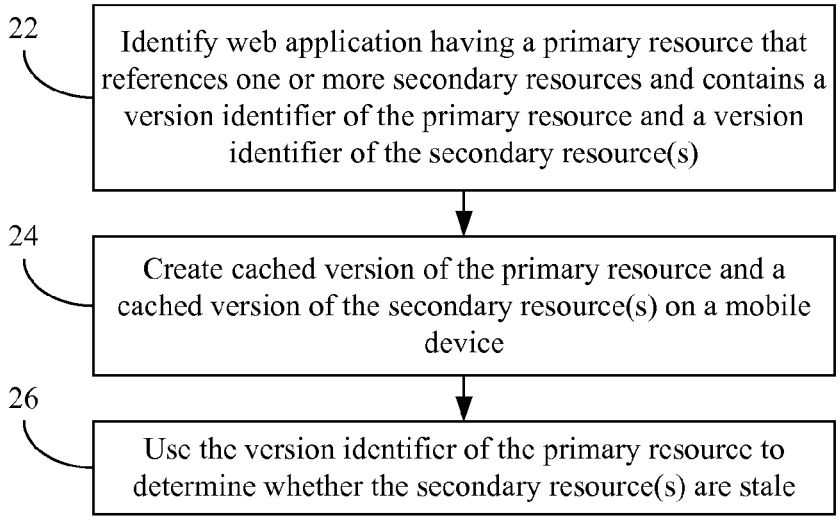
FIG. 2 is a flowchart of an example of a method of managing web applications on a mobile device according to an embodiment.

For example, FIG. 2 shows a method 20 of managing web applications on a mobile device in which illustrated processing block 22 provides for identifying a web application having a primary resource that references one or more secondary resources and contains a version identifier of the primary resource and a version identifier of the one or more secondary resources. A cached version of the primary resource and a cached version of the one or more secondary resources may be created at block 24 on a mobile device. Creation of the cached versions of the resources may be conducted, for example, when a user of the mobile device views the web application.

Of particular note is that block 24 may create a cached version of all of the secondary resources even if one or more of them is not accessed when the user views the web application. Thus, for example, if even if the user does not view the help page (e.g., help.html) of a web application on a first visit to the web application, that page may be cached on the mobile device at block 24. In this regard, a cache manifest, a preload procedure and/or a hidden iframe may be used to create the cached version of the secondary resources. More particularly, a cache manifest (e.g., linked file) as shown below might be used to describe all resources of the web application.

Cache Manifest
<Other Resources that Make Up the Web Application>
help.html Additionally, a JAVASCRIPT Extensible Markup Language (XML) Hypertext Transfer Protocol (HTTP) Request (XHR) may be used as a preload procedure to obtain each of the secondary resources of the web application. Such an XHR may be used to send HTTP or HTTPS requests to the web server(s) hosting the web application. In another example, the mobile device may link to the secondary resources via a hidden iframe. In either the preload procedure or hidden iframe example, the name of the resource may include the appropriate version identifier and the HTTP headers may be set to ensure that a staleness check will not be triggered for the resource.

Block 26 may provide for using the version identifier of the primary resource to determine whether the one or more secondary resources are stale. As will be discussed in greater detail, using the version identifier of the primary resource to conduct the staleness determination rather than relying on the staleness checking of each secondary resource may enable network accesses to be minimized. Minimizing network accesses/connections may in turn enhance performance and extend battery life.

Figures 3A, 3B:
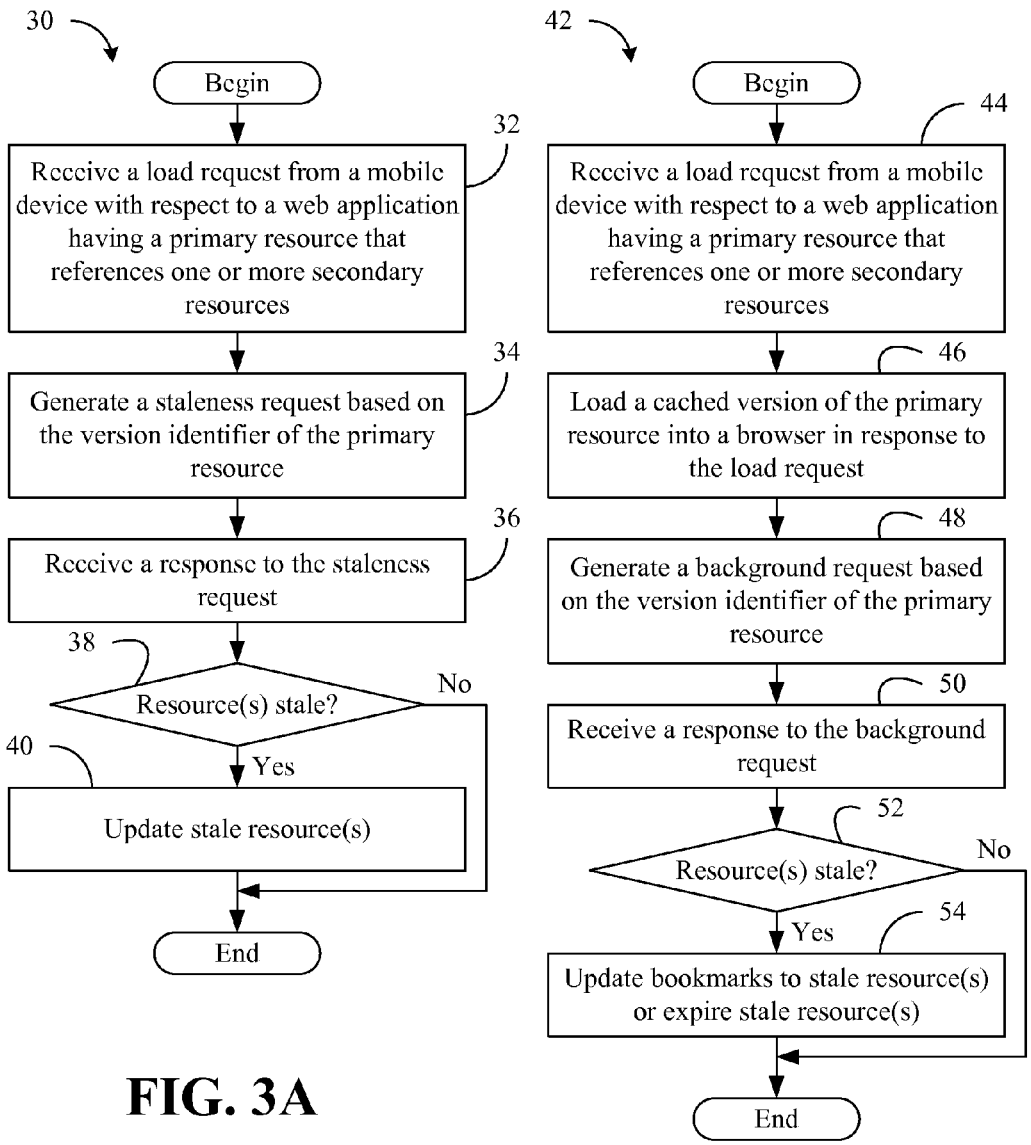
FIGS. 3A and 3B are flowcharts of examples of methods of processing load requests on mobile devices according to embodiments.

For example, FIG. 3A shows a method 30 of processing load requests on a mobile device in which block 32 may receive a load request from the mobile device with respect to a web application having a primary resource that references one or more secondary resources. The load request may be associated with a user request to open and/or view the web application (e.g., via selection of an application icon), a timer-based (e.g., scheduled) invocation of the web application, a sensor-triggered invocation of the web application, and so forth. Illustrated block 34 generates a staleness request in response to the load request based on the version identifier of the primary resource. Thus, block 34 might involve determining the version identifier 16 (FIG. 1) of the currently cached version of the primary resource on the mobile device, incorporating that version identifier into the staleness request and transmitting the staleness request to a remote server.

A response to the staleness request may be received at block 36, wherein illustrated block 38 determines whether the primary resource and/or secondary resources are stale based on the response. Thus, if the mobile device has cached "Version 1" of the primary resource in the above example of Table I and the response to the staleness request indicates that the most recent level of the primary resource is "Version 2", block 38 may automatically determine that the "image.png" secondary resource is stale (i.e., is currently cached at version 1.0 instead of version 1.1). Similarly, if the mobile device has cached "Version 2" of the primary resource in the above example of Table I and the response to the staleness request indicates that the most recent level of the primary resource is "Version 3", block 38 may automatically determine that the "controller.js" and "view.css" secondary resources are stale (i.e., controller.js is currently cached at version 1.1 instead of version 2.0 and view.css is currently cached at version 2.3 instead of version 3.0). If it is determined at block 38 that one or more of the resources are stale, illustrated block 40 updates the stale resources. Otherwise, not update is conducted.

Of particular note is that the staleness of all secondary resources may be determined solely based on the version identifier of the primary resource in the illustrated example. Moreover, disabling staleness checking in the individual secondary resources and transmitting the staleness request over a single connection that enables staleness verification of the web application in its entirety may reduce the number of network connections from N to one, where N is the number of secondary resources. Accordingly, the illustrated method 30 may significantly improve performance as well as battery life. Indeed, such an approach may be particularly advantageous of all of the secondary resources do not reside on the same remote server.

FIG. 3B shows another method 42 of processing load requests on a mobile device in which block 44 may receive a load request from the mobile device with respect to a web application having a primary resource that references one or more secondary resources. As already noted, the load request might be associated with a user request, timer-based invocation, sensor-triggered invocation, and so forth. Illustrated block 46 loads a cached version of the primary resource into a browser of the mobile device in response to the load request, wherein block 48 may generate and transmit a background request based on the version identifier of the primary resource. The background request may include, for example, an XHR. For example, the background request might contain "appl.html?version=next_random_chars_AHDFK" to check for a new version of the primary resource.

A response to the background request may be received at block 50, wherein illustrated block 52 determines whether the primary resource and/or secondary resources are stale based on the response to the background request. If it is determined that one or more resources are stale, block 54 may update bookmarks to the stale resources and/or expire the stale resources. For example, a bookmark of the browser on the mobile device may be updated to reference a more recent version of the cached version of the primary resource (e.g., from app.html?version=1 to app.html?version=2) if the response to the background request indicates that a secondary resource is stale. Additionally, the cached version of the primary resource may be expired if the background request indicates that a secondary resource is stale so that the next time the bookmark is loaded, a fresh copy of the primary resource is downloaded.

Thus, the method 42 may present an old version of the web application to the user, wherein on the next start of the web application the new version will be loaded. The background request may therefore be transmitted over a single connection that enables staleness verification of the web application in its entirety. Such an approach may effectively reduce the number of network connections from one to zero and further improve performance and battery life.

Cloud Caching

Figure 4:
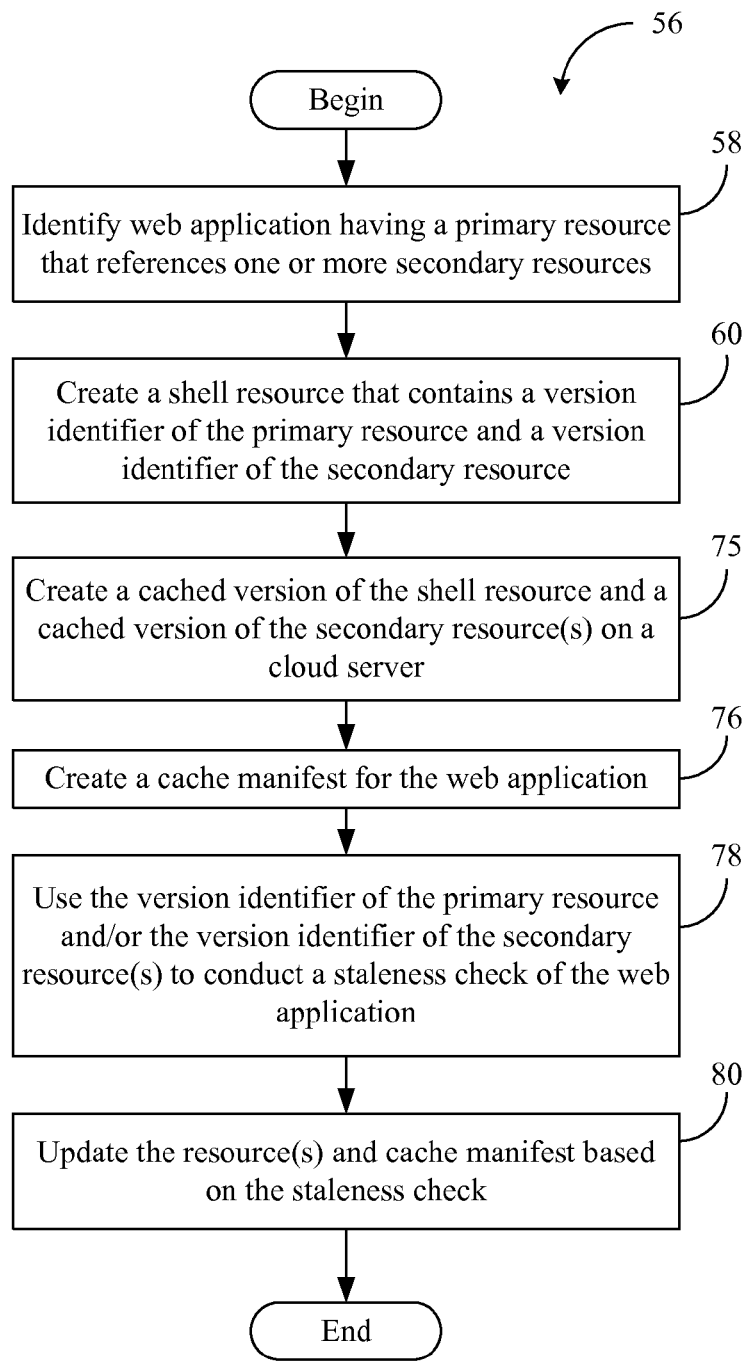
FIG. 4 is a flowchart of an example of a method of managing web applications on a cloud server according to an embodiment.

If a pre-existing web application is not structured to include version identifiers in the primary resource and disable staleness checking in the secondary resources, substantial performance and battery life improvements may still be achieved via cloud caching. For example, FIG. 4 shows a method 56 of managing web applications on a cloud server in which illustrated block 58 identifies a web application having a primary resource that references one or more secondary resources. A shell resource that contains a version identifier of the primary resource and version identifiers of the one or more secondary resources may be automatically created at block 60.

Figure 5:
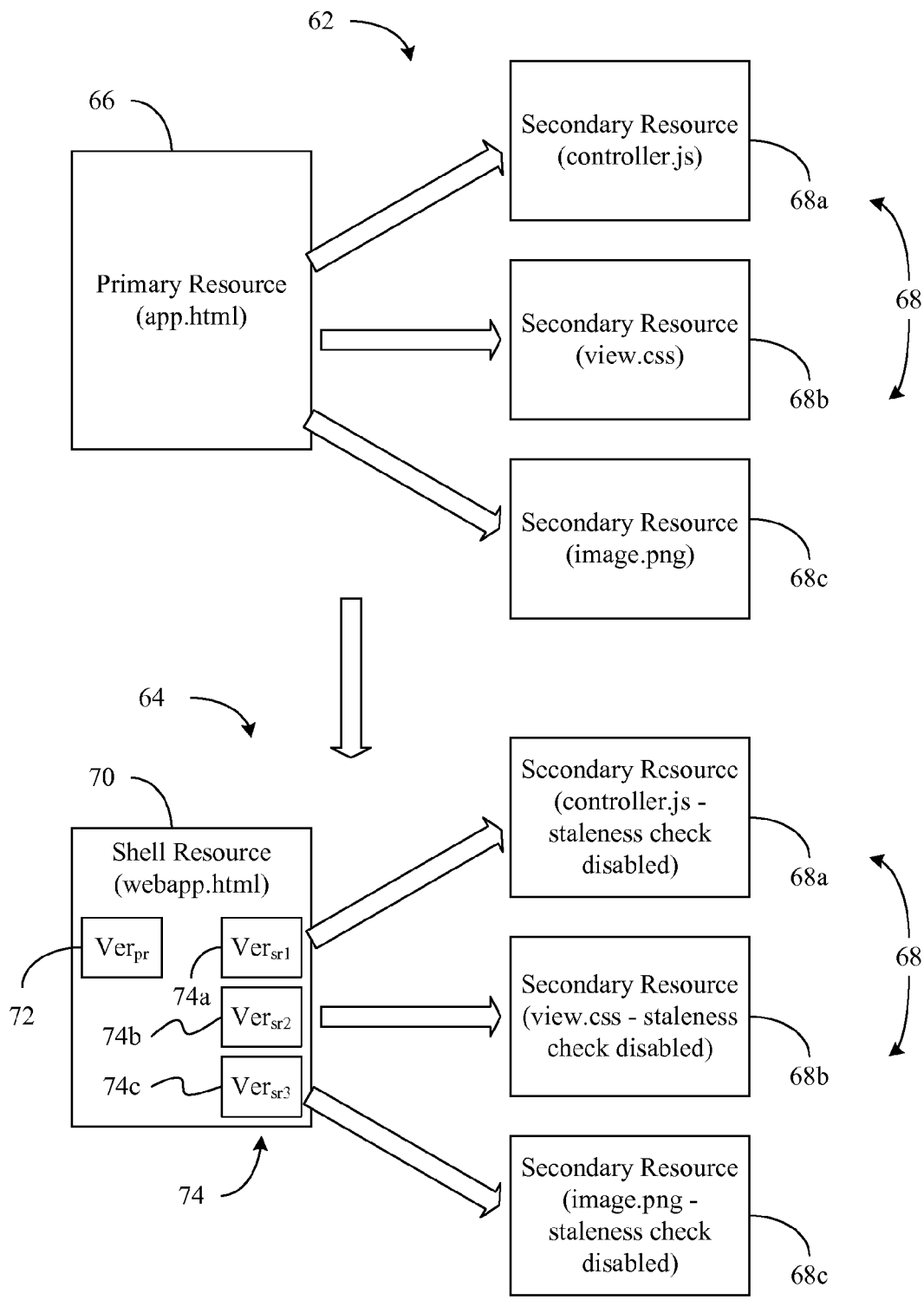
FIG. 5 is a block diagram of an example of a web application conversion according to an embodiment.
Figure 6:
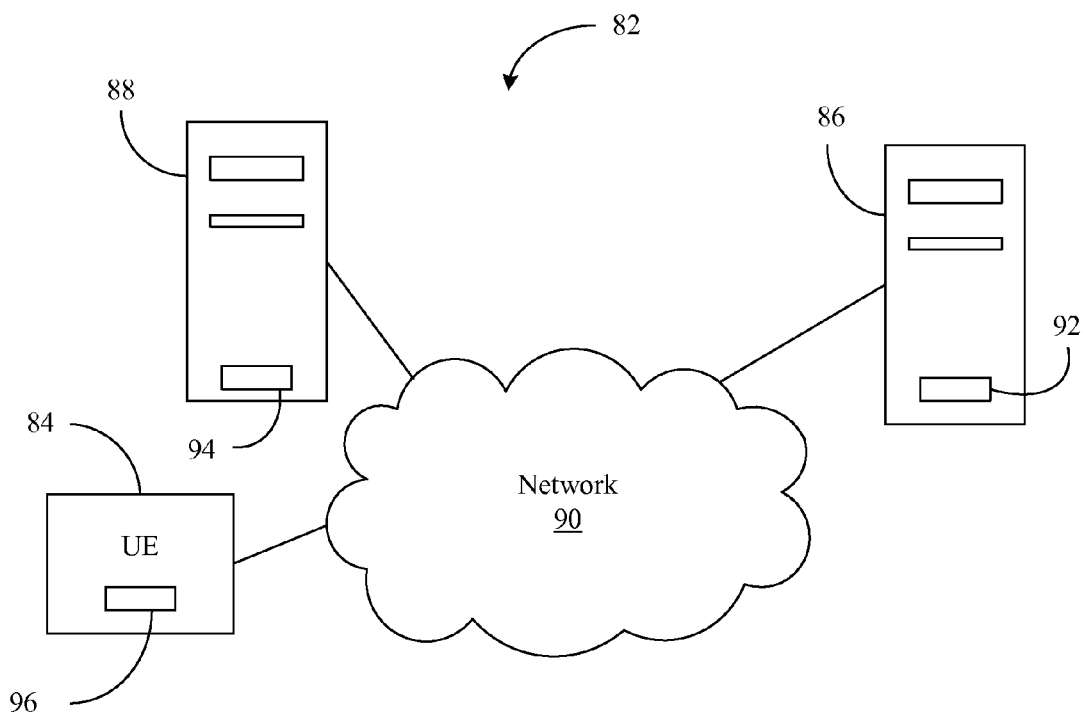
FIG. 6 is a block diagram of an example of a networking architecture according to an embodiment.

FIG. 5 shows an example of an automatic conversion of a pre-existing web application 62 into a modified web application 64. In the illustrated example, the pre-existing web application 62 includes a primary resource 66 that references one or more secondary resources 68 (68a-68c), as already discussed. The illustrated pre-existing web application 62 does not contain, however, version identifiers in the primary resource 66 or disabled staleness checking in the secondary resources 68.

Accordingly, a shell resource 70 (e.g., "webapp.html") may be automatically created, wherein the shell resource 70 contains a version identifier 72 ("$Ver_{pr}$") of the primary resource 66 and version identifiers 74 (74a-74c) of the secondary resources 68, as already discussed. For example, a first version identifier 74a ("$Ver_{sr1}$") may correspond to the JAVASCRIPT secondary resource 68a, a second version identifier 74b ("$Ver_{sr2}$") may correspond to the style sheet secondary resource 68b, a third version identifier 74c ("$Ver_{sr3}$") may correspond to the image secondary resource 68c, and so forth. The version identifier 72 may generally indicate the current version level of the primary resource 66 and the version identifiers 74 may generally indicate the current version level of the respective secondary resources 68. Staleness checking may also be effectively disabled in the secondary resources 68 by redirecting staleness checks (e.g., links associated with the secondary resources) to a cloud proxy. The illustrated conversion may be conducted by a cloud service and/or proxy that manages web applications on behalf of mobile devices and other client devices.

Returning now to FIG. 4, illustrated block 75 creates a cached version of the shell resource and a cached version of the one or more secondary resources on a cloud server. Additionally, block 76 may create a cache manifest for the web application. As already noted, the cache manifest may describe all resources of the web application and be used by the client devices and/or cloud server to determine whether to use cached or network copies of the resources. Table II below shows one example of such a manifest.

TABLE II

| webapp.html | webapp.appcache version 1 | webapp.appcache version 2 |
|---|---|---|
| <html manifest="webapp.appcache"> <head> <title>Version 1</title> <meta http-equiv="Content-Type" content="text/html; charset=UTF-8"> <scripttype="text/javascript" src="controller.js"/> <styletype="text/css" src="view.css"/> </head> <body>   <h1>Version 1</h1>   <img alt="Image Resource" src="image.png"/> </body> </html> | CACHE MANIFEST NETWORK: webapp.html controller.js view.css image.png | CACHE MANIFEST NETWORK: CACHE: webapp.html controller.js view.css image.png |

The version identifier of the primary resource and/or the version identifiers of the secondary resources may be used at block 78 to conduct a staleness check of the web application. Additionally, block 80 may provide for updating one or more of the cached version of the shell resource and the cached version of the one or more secondary resources based on the staleness check. Block 80 may also involve updating the cache manifest based on the staleness check.

Thus, if a subsequent load request is received from a mobile device with respect to the web application, the cloud server may return one or more of the primary resource and the secondary resources to the mobile device in response to the load request. In this regard, if it is determined that one or more of the secondary resources are not stale after a predetermined number of load requests, block 80 might indicate in the cache manifest that the secondary resources in question are to be cached on the mobile device for offline access (e.g., rightmost example of Table II).

FIG. 3 shows a networking architecture 82 in which a user equipment (UE) device 84 such as a mobile device accesses a web application 94 having a primary resource that references one or more secondary resources. In the illustrated example, a cloud server 86 manages the web application 94 on behalf of the UE device 84 as discussed with regard to the method 56 (FIG. 4) and the modified web application 64 (FIG. 5). The cloud server 86 may be centralized or distributed across a plurality of computing platforms and/or blades. The UE device 84 may generally access the web application 94 via the cloud server 64 rather than a web server 88 containing the most recent version of the web application 94. Accordingly, the cloud server 86 may communicate with the UE device 84 and the web server 88 via a network 90. The network 90 can itself include any suitable combination of servers, access points, routers, base stations, mobile switching centers, public switching telephone network (PSTN) components, etc., to facilitate communication between the UE device 84 and servers 86, 88.

In one example, the cloud server 86 includes logic 92 to identify the web application 94 and create a shell resource that contains a version identifier of the primary resource and version identifiers of the one or more secondary resources. The logic 92 may also disable staleness checking in the one or more secondary resources by redirecting links associated with the secondary resources to a cloud proxy, which may also run on the cloud server 86. In addition, the logic 92 may create a cached version of the shell resource and cached versions of the one or more secondary resources and create a cache manifest for the web application 94, wherein the UE device 84 and/or cloud server 86 may use the cache manifest to determine whether to access cached or network copies of the resources of the web application 94.

Thus, when the web application 94 is registered with the cloud server 86, a service may "crawl" the application 94—identifying all of the secondary/child resources. If, for example, a secondary resource has a URL (uniform resource locator) such as "*foo.com/style.css", the service may rewrite the resource to "* cloud-proxy/style-v1.css" and store it in the proxy under that address. The process of crawling and rewriting the resources in a way that reduces the number of mobile connections may be considered the "cloud service" of the cloud server 86 and the process of serving the resources to the UE device 84 may be considered the "cloud proxy" of the cloud server 86.

The logic 92 may also use one or more of the version identifier of the primary resource and the version identifier of the secondary resource to conduct a staleness check of the web application 94, update one or more of the cached version of the shell resource and the cached version of the secondary resource based on the staleness check, and update the cache manifest based on the staleness check. Thus, if a load request is later received from the UE device 84 with respect to the web application 94, the cloud server 86 may return one or more of the primary resource and the secondary resources to the mobile device in response to the load request. In this regard, if it is determined that one or more of the secondary resources are not stale after a predetermined number of load requests, the cloud server 86 might indicate in the cache manifest that the secondary resources in question are to be cached on the UE device 84 for offline access.

Alternatively, if the web application 94 already contains a version identifier of the primary resource and version identifiers of the secondary resources, the UE device 84 may include logic 96 to identify the web application 94, create a cached version of the primary resource and cached versions of the secondary resources on the UE device 84, and use the version identifier of the primary resource to determine whether the secondary resource are stale, as already discussed with respect to the method 20 (FIG. 2), the method 30 (FIG. 3A) and/or the method 42 (FIG. 3B).

Techniques described herein may therefore reduce and/or eliminate any concerns over intermittent or no Internet access when accessing web applications. More particularly, the use of cloud caching and/or simplified client-side staleness checking may provide significant performance and/or battery life improvements over conventional solutions.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions. In addition, the terms "first", "second", etc. may be used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

We claim:

1. A computer implemented method comprising:
   identifying a web application having a primary resource that references a secondary resource, wherein the secondary resource enables an overall functionality of the web application;
   creating a shell resource that contains a version identifier of the primary resource and a version identifier of the secondary resource;
   creating a cached version of the shell resource and a cached version of the secondary resource on a cloud server;
   creating a cache manifest for the web application;
   using one or more of the version identifier of the primary resource and the version identifier of the secondary resource to conduct a staleness check of the web application;
   updating one or more of the cached version of the shell resource and the cached version of the secondary resource based on the staleness check;
   updating the cache manifest based on the staleness check; and
   disabling staleness checking of version identifiers in the secondary resource.

2. The method of claim 1, wherein disabling staleness checking in the secondary resource includes redirecting a link associated with the secondary resource to a cloud proxy.

3. The method of claim 1, wherein updating the cache manifest includes:
   determining that the secondary resource is not stale after a predetermined number of load requests; and
   indicating in the cache manifest that the secondary resource is to be cached on a client device for offline access.

4. The method of claim 1, further including:
   receiving a load request from a client device with respect to the web application; and
   returning one or more of the primary resource and the secondary resource to the client device in response to the load request.

5. The method of claim 4, wherein the staleness check is conducted prior to receiving the load request.

6. A computer program product comprising:
   a non-transitory computer readable storage medium; and
   computer usable code stored on the computer readable storage medium, where, if executed by a processor, the computer usable code causes a cloud server to:
   identify a web application having a primary resource that references a secondary resource, wherein the secondary resource enables an overall functionality of the web application;
   create a shell resource that contains a version identifier of the primary resource and a version identifier of the secondary resource;
   create a cached version of the shell resource and a cached version of the secondary resource on the cloud server;
   create a cache manifest for the web application;
   use one or more of the version identifier of the primary resource and the version identifier of the secondary resource to conduct a staleness check of the web application;
   update one or more of the cached version of the shell resource and the cached version of the secondary resource based on the staleness check;
   update the cache manifest based on the staleness check; and
   disable staleness checking of version identifiers in the secondary resource.

7. The computer program product of claim 6, wherein the computer usable code, if executed, causes a cloud server to redirect a link associated with the secondary resource to a cloud proxy to disable staleness checking in the secondary resource.

8. The computer program product of claim 6, wherein the computer usable code, if executed, causes a cloud server to:
   determine that the secondary resource is not stale after a predetermined number of load requests; and
   indicate in the cache manifest that the secondary resource it to be cached on a client device for offline access.

9. The computer program product of claim 6, wherein the computer usable code, if executed, causes a cloud server to:
   receive a load request from a client device with respect to the web application; and
   return one or more of the primary resource and the secondary resource to the client device in response to the load request.

10. The computer program product of claim 9, wherein the staleness check is to be conducted prior to receiving the load request.

11. A computer program product comprising:
    a non-transitory computer readable storage medium; and
    computer usable code stored on the computer readable storage medium, where, if executed by a processor, the computer usable code causes a client device to:

identify a web application having a primary resource that references a secondary resource, wherein the secondary resource enables the overall functionality of the web application, wherein the primary resource contains a version identifier of the primary resource and a version identifier of the secondary resource;

create a cached version of the primary resource and a cached version of the secondary resource on the client device;

use the version identifier of the primary resource to determine whether the secondary resource is stale; and determine that staleness checking of version identifiers has been disabled in the secondary resource based on a max-age header of the secondary resource.

12. The computer program product of claim 11, wherein the computer usable code, if executed, causes a mobile device to:

receive a load request with respect to the web application;

load the cached version of the primary resource into a browser in response to the load request; and generate a background request based on the version identifier of the primary resource, wherein a response to the background request is to indicate whether the secondary resource is stale.

13. The computer program product of claim 12, wherein the computer usable code, if executed, causes a client device to update a bookmark of the browser to reference a more recent version of the cached version of the primary resource if the response to the background request indicates that the secondary resource is stale.

14. The computer program product of claim 12, wherein the computer usable code, if executed, causes a client device to expire the cached version of the primary resource if the response to the background request indicates that the secondary resource is stale.

15. The computer program product of claim 12, wherein the computer usable code, if executed, causes a client device to transmit the background request over a single connection that enables staleness verification of the web application in its entirety.

16. The computer program product of claim 11, wherein the computer usable code, if executed, causes a client device to:

receive a load request with respect to the web application; and generate a staleness request in response to the load request based on the version of the identifier of the primary resource.

17. The computer program product of claim 11, wherein one or more of a cache manifest, a preload procedure and a hidden iframe is to be used to create the cached version of the secondary resource.

\* \* \* \* \*